Figure 2:
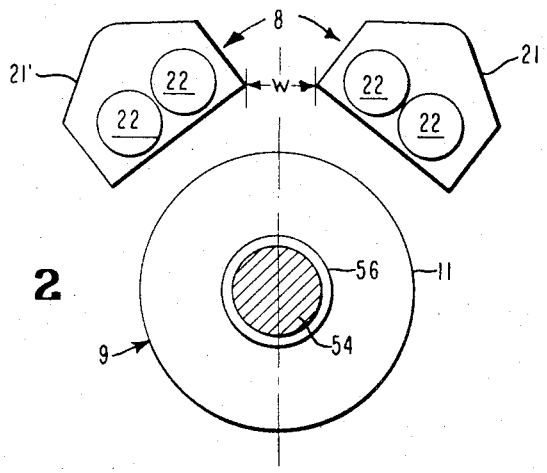
Figure 5:
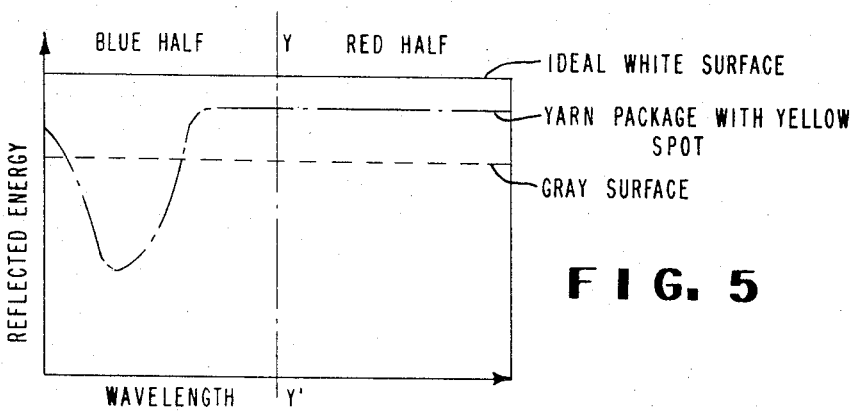
Figure 6:
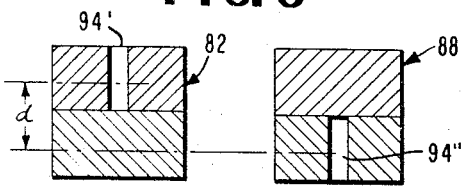
Figure 7:
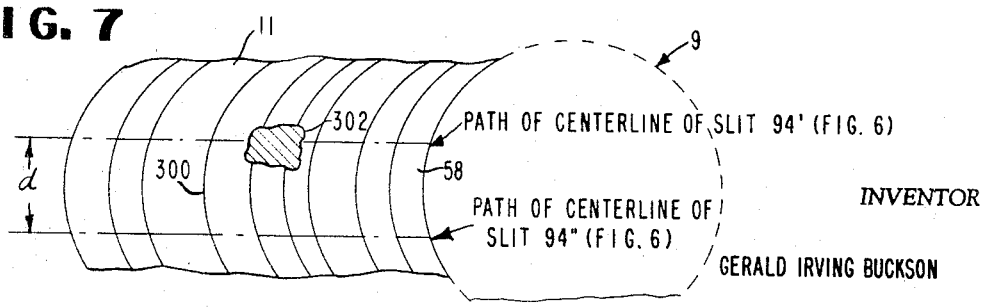
Figure 4:
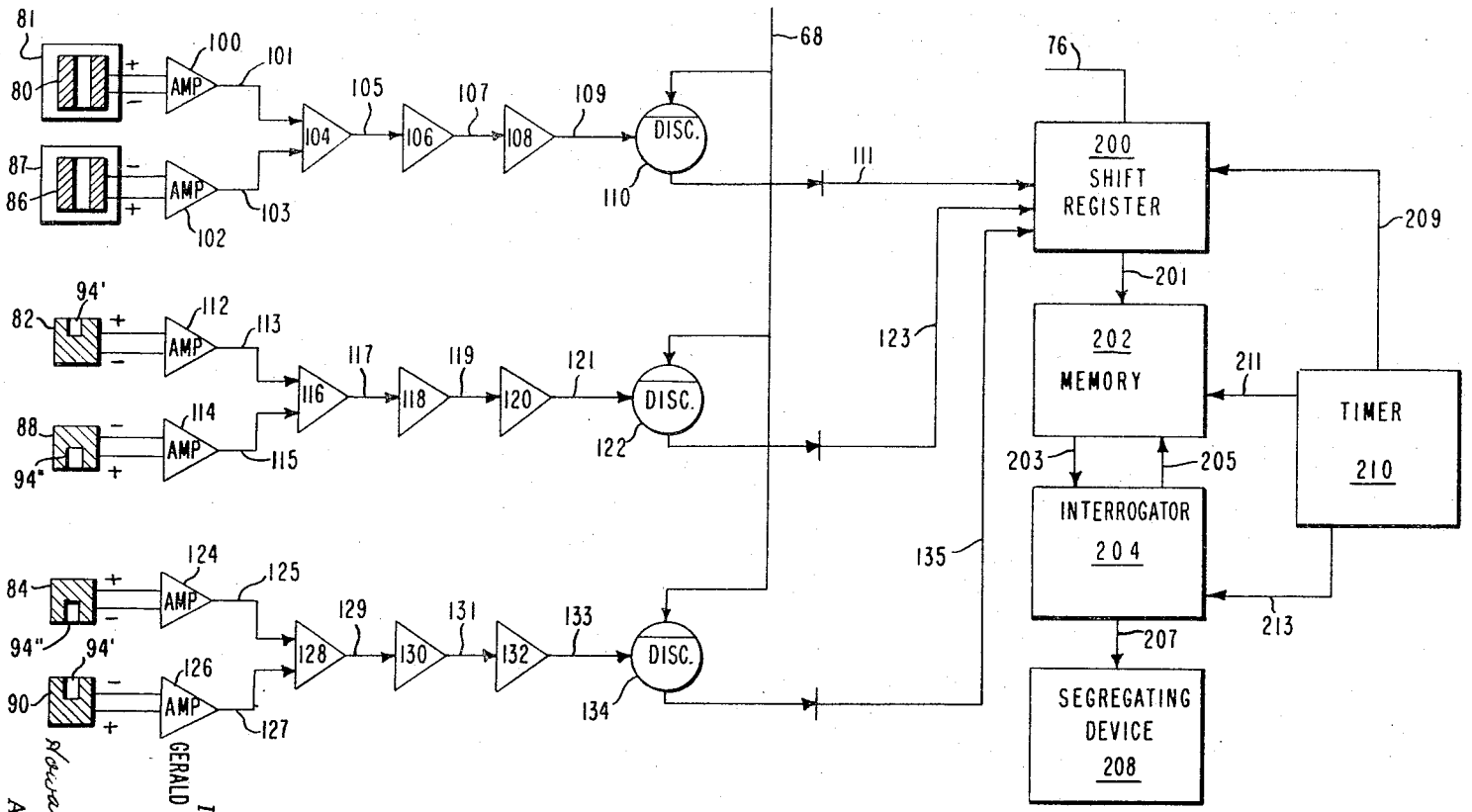

T861055

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 29, 1969

861 O.G. 1356

749,337

DEFECT DETECTOR HAVING ROTATING PRISM SCANNER HAVING PLURALITY OF PAIRS OF PHOTOCELLS WITH COLORING AND SPACE FILTERING

Gerald Irving Buckson, Newark, Del., assignor to Troxel Manufacturing Company, Moscow, Tenn., a corporation of Ohio

Filed Aug. 1, 1968. Published Apr. 29, 1969
Int. Cl. G01n *21/30;* H01j *5/16*
U.S. Cl. 250—219
3 Sheets Drawing. 17 Pages Specification

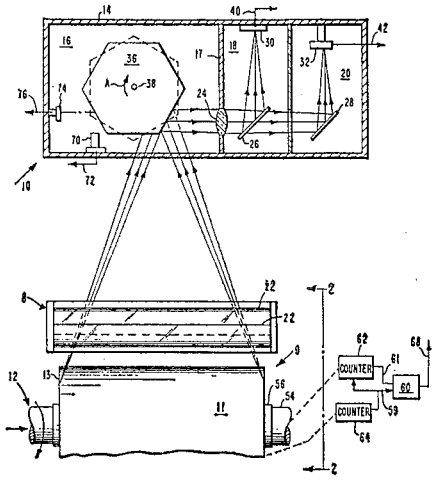

An apparatus for detecting off-color and gray spot defects on the peripheral face surface of a rotating cylindrical yarn package wherein diffuse white light is projected onto a narrow strip, parallel to the package axis, on the surface. The illuminated portion of the surface is viewed and the illumination therefrom is directed to two arrays of photodetectors which view the directed light spectrum through complementary space and color filtering means and emit electrical signals proportional to the energy received from the filtered directed light. Electronic circuitry is provided to subtract, amplify and discriminate signals from the complementary arrays of photodetectors in order to detect and record defects on the package surface exceeding a predetermined level. Means are also provided to segregate unacceptable packages.

T861055
April 29, 1969 G. I. BUCKSON DEF. PUB.
DEFECT DETECTOR HAVING ROTATING PRISM SCANNER HAVING PLURALITY OF PAIRS OF PHOTOCELLS WITH COLORING AND SPACE FILTERING
SN-749337
Filed Aug. 1, 1968
Sheet 1 of 3
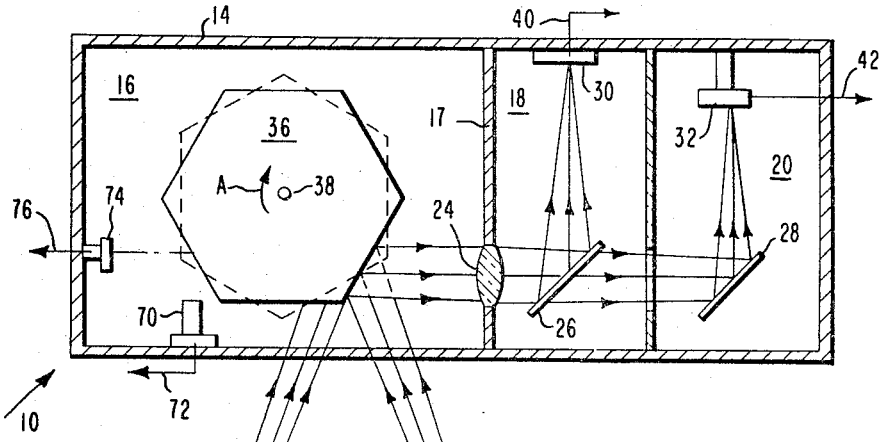
FIG. 1
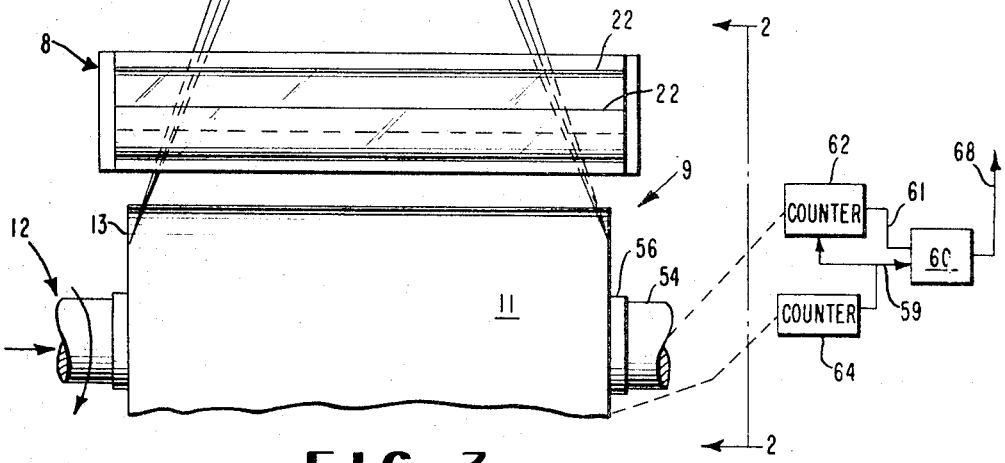
FIG. 3
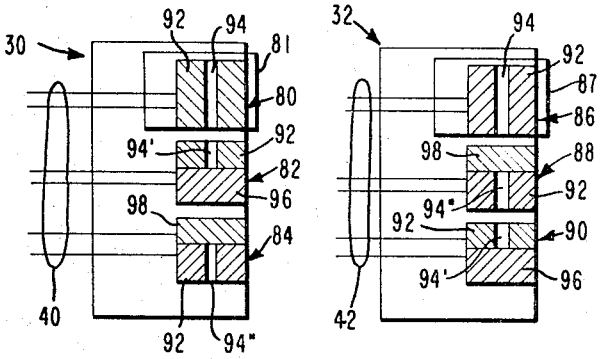
INVENTOR
GERALD IRVING BUCKSON
BY Howard P. West Jr.
ATTORNEY

T861055

April 29, 1969 G. I. BUCKSON DEF. PUB.

DEFECT DETECTOR HAVING ROTATING PRISM SCANNER HAVING PLURALITY OF PAIRS OF PHOTOCELLS WITH COLORING AND SPACE FILTERING

SN-749337

Filed Aug. 1, 1968 Sheet 2 of 3

INVENTOR

GERALD IRVING BUCKSON

BY Howard P. Witt Jr

ATTORNEY

April 29, 1969

G. I. BUCKSON

DEFECT DETECTOR HAVING ROTATING PRISM SCANNER HAVING PLURALITY OF PAIRS OF PHOTOCELLS WITH COLORING AND SPACE FILTERING

Filed Aug. 1, 1968

DEF. PUB. T861055

SN-749337

Sheet 3 of 3

INVENTOR
GERALD IRVING BUCKSON

Howard P. Witt Jr.
ATTORNEY